(12) United States Patent
Williams et al.

(10) Patent No.: US 8,726,893 B2
(45) Date of Patent: May 20, 2014

(54) FUEL CONTROL SYSTEM AND ASSOCIATED METHOD

(75) Inventors: Rodger K. Williams, Siler City, NC (US); Edward Payne, Greensboro, NC (US)

(73) Assignee: Immixt, LLC, Siler City, NC (US)

( * ) Notice: Subject to any disclaimer, the term of this patent is extended or adjusted under 35 U.S.C. 154(b) by 0 days.

(21) Appl. No.: 13/073,242

(22) Filed: Mar. 28, 2011

(65) Prior Publication Data

US 2011/0224884 A1 Sep. 15, 2011

Related U.S. Application Data

(63) Continuation of application No. 11/346,052, filed on Feb. 2, 2006, now Pat. No. 8,006,677.

(51) Int. Cl.
*F02M 69/46* (2006.01)
*F02D 19/08* (2006.01)

(52) U.S. Cl.
USPC .......................................................... 123/575

(58) Field of Classification Search
USPC ................................................ 123/575–577
See application file for complete search history.

(56) References Cited

U.S. PATENT DOCUMENTS

| | | |
|---|---|---|
| 2,911,958 A | 11/1959 | Griep |
| 3,912,543 A | 10/1975 | Delahunt |
| 4,323,046 A | 4/1982 | Barber |
| 4,345,141 A | 8/1982 | Little |
| 4,413,604 A | 11/1983 | Tune |
| 4,471,744 A | 9/1984 | Holtz |
| 4,572,133 A | 2/1986 | Bago |
| 4,712,516 A | 12/1987 | Eberhardt |
| 4,865,005 A | 9/1989 | Griffith |
| 4,964,376 A | 10/1990 | Veach et al. |
| 5,105,063 A | 4/1992 | Hockemier |
| 5,237,978 A | 8/1993 | Bailey |
| 5,245,953 A | 9/1993 | Shimada et al. |

(Continued)

FOREIGN PATENT DOCUMENTS

| | | |
|---|---|---|
| DE | 4131626 A1 | 3/1993 |
| DE | 19823335 A1 | 12/1999 |

(Continued)

OTHER PUBLICATIONS

Notice of Allowance for U.S. Appl. No. 11/748,022 mailed May 11, 2012, 5 pages.

(Continued)

*Primary Examiner* — M. McMahon
(74) *Attorney, Agent, or Firm* — Withrow & Terranova, PLLC

(57) ABSTRACT

A fuel control system and method for providing fuel to an internal combustion engine are provided. The fuel control system generally includes at least one valve device structured to deliver a fuel supply to the engine, a first fuel source structured to provide a primary fuel to the valve device, a second fuel source structured to provide an alternate fuel to the valve device, and an electronic controller structured to control the valve device. The electronic controller controls the valve device as a function of various data to selectively deliver the primary fuel and the alternate fuel to generate a fuel supply, e.g. as a mixture of the two fuels. The data used to control the fuel supply may include GPS data, engine data, environmental data, and/or other operational data.

31 Claims, 16 Drawing Sheets

(56) References Cited

U.S. PATENT DOCUMENTS

| | | | |
|---|---|---|---|
| 5,271,370 | A | 12/1993 | Shimada et al. |
| 5,336,396 | A | 8/1994 | Shetley |
| 5,450,832 | A | 9/1995 | Graf |
| 5,469,830 | A * | 11/1995 | Gonzalez ............... 123/515 |
| 5,505,177 | A | 4/1996 | Herdin et al. |
| 5,662,090 | A | 9/1997 | Ward |
| 5,775,308 | A | 7/1998 | Headley |
| 5,911,210 | A | 6/1999 | Flach |
| 6,016,457 | A | 1/2000 | Toukura et al. |
| 6,035,837 | A | 3/2000 | Cohen et al. |
| 6,112,151 | A | 8/2000 | Kruse |
| 6,145,494 | A | 11/2000 | Klopp |
| 6,260,539 | B1 | 7/2001 | Minowa et al. |
| 6,370,472 | B1 | 4/2002 | Fosseen |
| 6,494,192 | B1 * | 12/2002 | Capshaw et al. ............ 123/576 |
| 6,668,804 | B2 | 12/2003 | Dobryden et al. |
| 6,687,597 | B2 | 2/2004 | Sulatisky et al. |
| 6,698,387 | B1 | 3/2004 | McFarland et al. |
| 6,839,619 | B2 | 1/2005 | Bellinger |
| 6,957,542 | B1 | 10/2005 | Kido et al. |
| 7,019,626 | B1 * | 3/2006 | Funk ....................... 340/438 |
| 7,044,103 | B2 * | 5/2006 | May ........................ 123/299 |
| 7,107,942 | B2 | 9/2006 | Weissman et al. |
| 7,353,810 | B1 | 4/2008 | Blaschke |
| 7,581,528 | B2 * | 9/2009 | Stein et al. ................. 123/431 |
| 7,640,913 | B2 | 1/2010 | Blumberg et al. |
| 7,650,878 | B2 | 1/2010 | Kleinberger |
| 7,841,317 | B2 * | 11/2010 | Williams et al. ............. 123/304 |
| 8,006,677 | B2 * | 8/2011 | Williams et al. ............. 123/575 |
| 8,256,401 | B2 | 9/2012 | Payne et al. |
| 2002/0011491 | A1 | 1/2002 | Rosen et al. |
| 2002/0152999 | A1 * | 10/2002 | Holder et al. ................ 123/575 |
| 2005/0028791 | A1 * | 2/2005 | Niimi ........................ 123/478 |
| 2005/0072384 | A1 | 4/2005 | Hadley et al. |
| 2006/0081230 | A1 * | 4/2006 | Kangler ..................... 123/575 |
| 2007/0119429 | A1 | 5/2007 | Jacquay |
| 2008/0262701 | A1 * | 10/2008 | Williams et al. ............. 701/103 |

FOREIGN PATENT DOCUMENTS

| | | |
|---|---|---|
| DE | 19922748 A1 | 11/2000 |
| DE | 10217664 A1 | 11/2003 |
| EP | 1790839 A2 | 5/2007 |
| JP | 2003065094 | 3/2003 |
| JP | 2004190935 | 7/2004 |
| WO | 2006005930 A2 | 1/2006 |
| WO | WO 2006005930 A3 * | 7/2006 |

OTHER PUBLICATIONS

Advisory Action for U.S. Appl. No. 11/748,022 mailed Nov. 29, 2011, 3 pages.
Final Office Action for U.S. Appl. No. 11/748,022 mailed Nov. 29, 2010, 7 pages.
Notice of Allowance for U.S. Appl. No. 11/696,765 mailed Jan. 28, 2010, 6 pages.
Non-final Office Action for U.S. Appl. No. 11/696,765 mailed May 28, 2009, 9 pages.
Notice of Allowance for U.S. Appl. No. 11/346,052 mailed Apr. 19, 2011, 2 pages.
Notice of Allowance for U.S. Appl. No. 11/346,052 mailed Apr. 1, 2011, 5 pages.
Final Office Action for U.S. Appl. No. 11/346,052 mailed Nov. 30, 2010, 7 pages.
Non-final Office Action for U.S. Appl. No. 11/346,052 mailed Apr. 28, 2010, 7 pages.
Non-final Office Action for U.S. Appl. No. 11/346,052 mailed Nov. 20, 2007, 5 pages.
Final Office Action for U.S. Appl. No. 11/346,052 mailed Apr. 17, 2008, 6 pages.
Non-final Office Action for U.S. Appl. No. 11/346,052 mailed Nov. 28, 2007, 5 pages.
Non-final Office Action for U.S. Appl. No. 11/346,052 mailed Apr. 10, 2007, 6 pages.
Notice of Allowance for U.S. Appl. No. 12/105,823 mailed Aug. 6, 2010, 5 pages.
Non-final Office Action for U.S. Appl. No. 12/105,823 mailed Apr. 13, 2000, 4 pages.
Notice of Allowance for U.S. Appl. No. 12/903,754 mailed Nov. 26, 2010, 4 pages.
"Frybrid Diesel/Vegetable Oil," available at http://www.frybrid.com/frybrid.htm, Aug. 23, 2005, 2 pages.
"Greasecar Vegetable Fuel Systems," available at http://greasecar.com/product_detail.cfm, Aug. 23, 2005, 2 pages.
Non-final Office Action for U.S. Appl. No. 12/718,722 mailed Dec. 20, 2012, 10 pages.
Notice of Allowance for U.S. Appl. No. 12/718,722 mailed May 1, 2013, 8 pages.
Non-final Office Action for U.S. Appl. No. 13/567,315 mailed Jul. 23, 2013, 9 pages.

* cited by examiner

FUEL CONTROL SYSTEM AND ASSOCIATED METHOD

RELATED APPLICATIONS

The present application claims priority as a continuation application of Ser. No. 11/346,052 titled "FUEL CONTROL SYSTEM AND ASSOCIATED METHOD" which is incorporated herein by reference in its entirety.

BACKGROUND OF THE INVENTION

1) Field of the Invention

The present invention relates to fuel systems for internal combustion engines and more particularly to fuel systems that provide both primary fuel and alternate fuel to an internal combustion engine.

2) Description of Related Art

For a variety of reasons, most of which relate to environmental and alternative energy pursuits, certain primary fuel engines, such as diesel engines, can be made to accommodate alternate fuels, such as straight vegetable oil (SVO), "biodiesel," and other fuel oils (hereinafter "alternate fuels"). However, practical applications have demonstrated that full-time use of these alternate fuels is not desirable. For instance, at low temperatures the viscosity of some of these alternate fuels is not optimal for use in an engine designed to run on primary fuel. The alternate fuel should be heated up to a temperature that will allow it to easily pass through the fuel delivery system. If left in an idle engine to cool, the alternate fuel also has a tendency to increase in viscosity and thus congeal inside the fuel delivery components. Thus, the alternate fuel should not be used until it has reached an appropriate temperature and it should be purged from the engine before shutting down. As a result, some of these systems typically run on diesel fuel during start-up and before shut down, and rely on the consumer to manually switch to the alternate fuel source in between, i.e., when the alternate fuel is at an optimal temperature. For example, in an automobile that has been modified to include diesel and alternative fuel tanks, a driver can selectively toggle between the two fuels during operation of the vehicle using a switch that controls the flow of the two fuels.

Recently, some aftermarket automated control systems have been designed. These systems control the switching between a diesel fuel source and an alternative fuel source based on the temperature of the alternate fuel. Typically, when the engine is cold, such as during engine start, the engine operates using primary fuel, and once a predetermined alternate fuel temperature or a certain vehicle speed is achieved, the engine is then switched to the alternate fuel. If low temperature operation reoccurs, the engine is then switched back to primary fuel, and so on.

To automate this fuel selection process, various conventional aftermarket control systems have been designed that acquire and monitor alternate fuel temperature by using various measurement devices, such as temperature sensors. However, these aftermarket systems are constrained in that they relate switching between the two fuel sources based directly on the temperature of the alternate fuel. Furthermore, conventional control systems that switch between primary fuel and alternate fuel use either 100% primary fuel or 100% alternate fuel at all times, even though neither fuel may be optimal during some operating conditions. This abrupt switching of fuels can result in abrupt changes in engine behavior. Reduced or unacceptable performance may be experienced at or near the switching transition point, and potential utilization of alternate fuel may be forfeited during intermediate conditions by forcing premature switching of fuel to mitigate transition behavior. As a result, conventional alternate fuel systems typically suffer from difficulty in integration, do not accommodate grade loading, exhibit poor performance at fuel type transition points, must underutilize alternate fuel, and are not applicable to engine types intolerable of 100% alternate fuel mixtures.

Therefore, an improved system and method of automatically supplying an internal combustion engine with a primary fuel, an alternate fuel, or a combination of both, based on a variety of operating conditions are desired.

BRIEF SUMMARY OF THE INVENTION

The present invention provides a fuel control system for controlling the use of a primary fuel and an alternate fuel in an internal combustion engine. In one embodiment, the present invention comprises at least one valve device structured to deliver a fuel supply to the engine, a first fuel source structured to provide a primary fuel to the valve device, a second fuel source structured to provide an alternate fuel to the valve device, an electronic controller structured to control the valve device, and a global positioning system (GPS) receiver configured to transmit GPS data to the electronic controller, wherein the electronic controller controls the valve device according to the GPS data to selectively deliver the primary fuel and the alternate fuel to generate the fuel supply. The fuel control system may also deliver a mixture of the primary fuel and the alternate fuel to generate the fuel supply.

The GPS data may include vehicle speed, vehicle altitude, and ground surface grade. The primary fuel may comprise one of a diesel fuel or a bio-diesel fuel and the alternate fuel may comprise one of a vegetable oil fuel or a bio-diesel fuel. The system may also include a data threshold value, wherein the electronic controller controls the valve device to use mainly primary fuel below the data threshold value, and the electronic controller controls the valve device to use mainly alternate fuel above the data threshold value.

The fuel control system may also include a primary valve device that receives the primary fuel from the first fuel source and an alternate value device that receives alternate fuel from the second fuel source, wherein the electronic controller controls the primary valve device according to the GPS data to selectively deliver the primary fuel, and the electronic controller controls the alternate valve device according to the GPS data to selectively deliver the alternate fuel, and wherein a mixture of the primary fuel delivered by the primary valve device and the alternate fuel used by the alternate valve device generates the fuel supply.

The fuel control system may also include at least one of a heating mechanism structured to heat the alternate fuel, a temperature sensing device structured to sense the temperature of the alternate fuel, an alternate fuel volume measurement device structured to measure the volume of the alternate fuel in the second fuel source, and a primary fuel volume measurement device structured to measure volume of the alternate fuel in the first fuel source. In another aspect, the electronic controller may receive engine data from the engine, wherein the electronic controller controls the valve device according to at least one of the GPS data and the engine data to selectively deliver the primary fuel and the alternate fuel to generate the fuel supply. The engine data may comprise at least one of engine RPM data, fuel injection timing data, engine exhaust temperature data, engine exhaust particulate data, engine throttle position data, transmission status data, emission control system data, ignition status data, and user preferences.

In another embodiment, the present invention provides a fuel control system that includes at least one valve device structured to deliver a fuel supply to the engine, a first fuel source structured to provide a primary fuel to the valve device, a second fuel source structured to provide an alternate fuel to the valve device, and an electronic controller structured to receive operational data and to control the valve device, wherein the electronic controller controls the valve device according to the operational data to selectively deliver the primary fuel and the alternate fuel to generate the fuel supply. In one aspect, the electronic controller may control the valve device to deliver a mixture of the primary fuel and the alternate fuel according to the operational data. In another aspect, the operational data may comprise at least one of the speed of the vehicle, engine RPM data, fuel injection timing data, engine exhaust temperature data, engine exhaust particulate data, engine throttle position data, transmission status data, emission control system data, altitude data, ground grade data, diesel fuel volume data, vegetable fuel volume data, vegetable fuel temperature data, and user preference data.

The fuel control system may include at least one of a primary fuel flow measurement device structured to measure a primary fuel flow rate, an alternate fuel flow measurement device structured to measure an alternate fuel flow rate, and a fuel supply flow measurement device structured to measure a fuel supply flow rate. The flow measurement devices may provide flow rate data to the electronic controller, and the electronic controller may provide an indication of the amount of use of the alternate fuel.

In another embodiment, the valve device may comprise at least one fuel injector structured to deliver fuel to a combustion chamber of the engine. The at least one fuel injector may be structured to deliver a mixture of fuel to the combustion chamber of the engine. The fuel injector may comprise a first fuel injector that receives the primary fuel from the first fuel source, and a second fuel injector that receives the alternate fuel from the second fuel source. The first fuel injector may deliver a stream of primary fuel to the combustion chamber of the engine and said second fuel injector may deliver a stream of alternate fuel to the combustion chamber of the engine. The first fuel injector may be controlled according to a first fuel injector output pulse and the second fuel injector may be controlled according to a second fuel injector output pulse, wherein an original fuel injector timing pulse is divided to create the first and second fuel injector output pulses. The fuel injectors may be gated sequentially wherein either fuel injector may be gated before the other. The fuel injectors may also be gated non-sequentially. Delays may also be introduced.

In another embodiment, the present invention provides a method of controllably delivering fuel to an internal combustion engine of a vehicle that comprises transmitting operational data to an electronic controller, and controlling at least one valve device with the electronic controller to selectively deliver at least one of a primary fuel, an alternate fuel, or a mixture of the primary fuel and the alternate fuel to the engine according to the operational data. The step of controlling the at least one valve device may also comprise controlling a first valve device and a second valve device to deliver at least one of the primary fuel, the alternate fuel, or a mixture of the primary fuel and the alternate fuel to the engine according to the operational data.

Thus, the fuel control system of the present invention can be used to facilitate the use of a primary fuel and an alternate fuel in an internal combustion engine. The present invention can be simple and inexpensive, and in some cases, can be easily adaptable to vehicles designed to operate using a primary fuel. Thus, the present invention can be used to convert such an engine to one that is capable of using both a primary fuel source and an alternate fuel source.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

Figure 7:
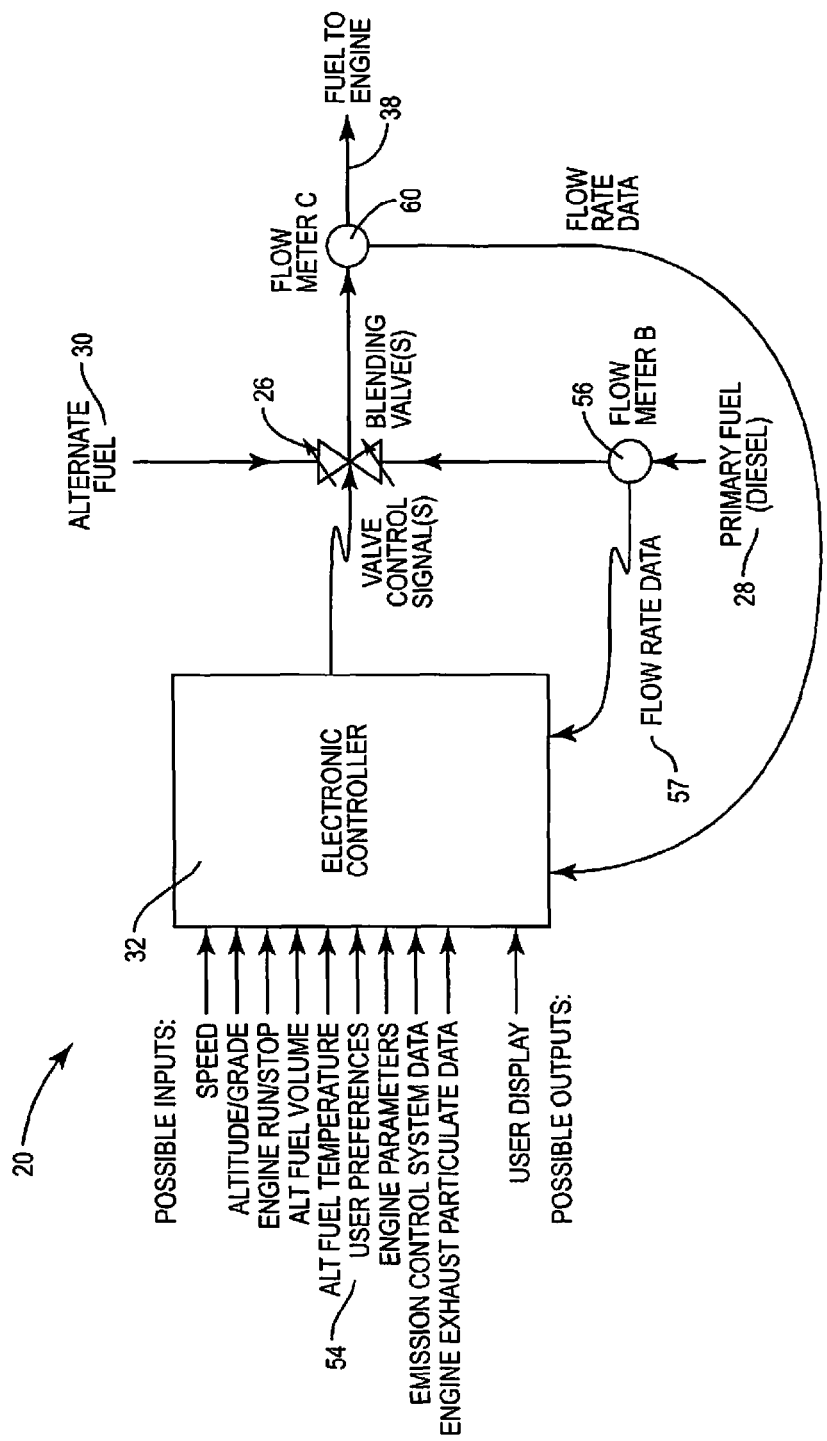
Figure 8:
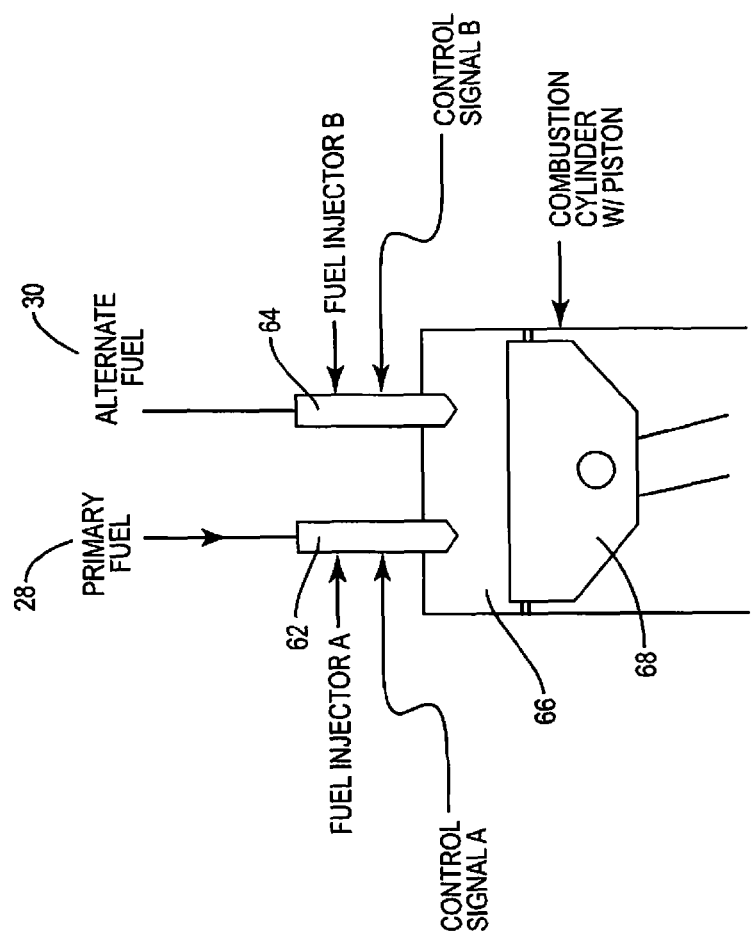
Figure 9:
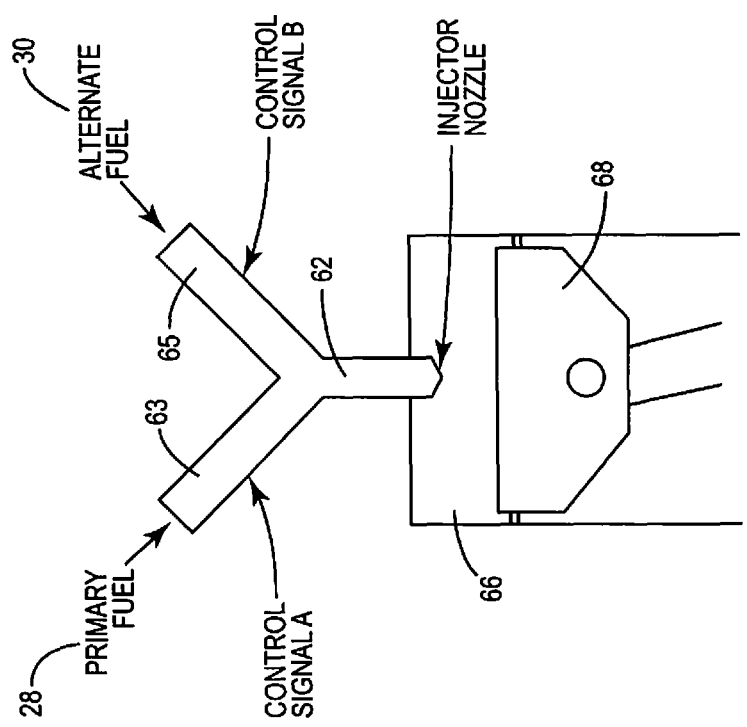
Figure 10:
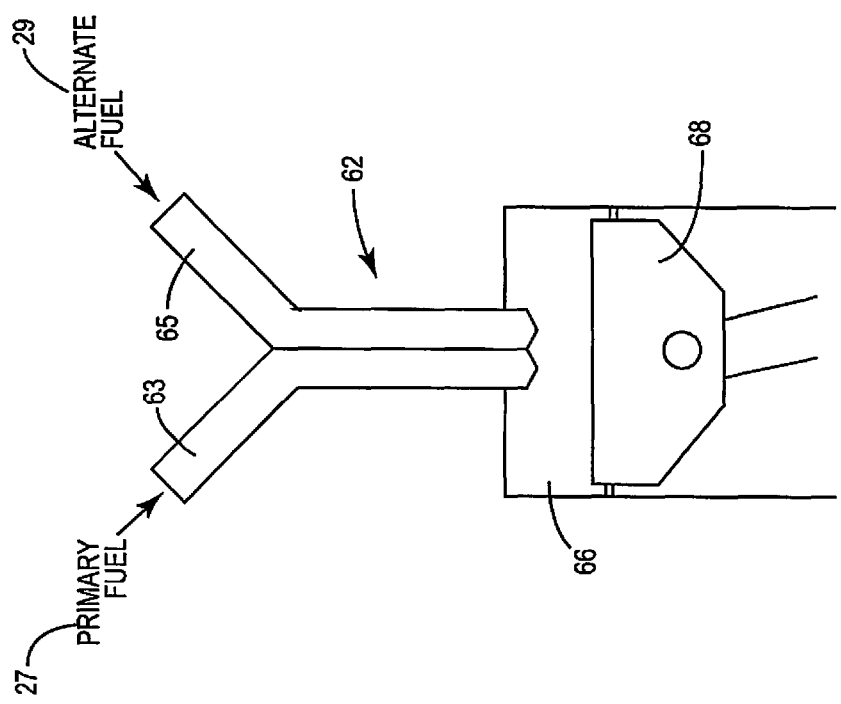
Figure 11:
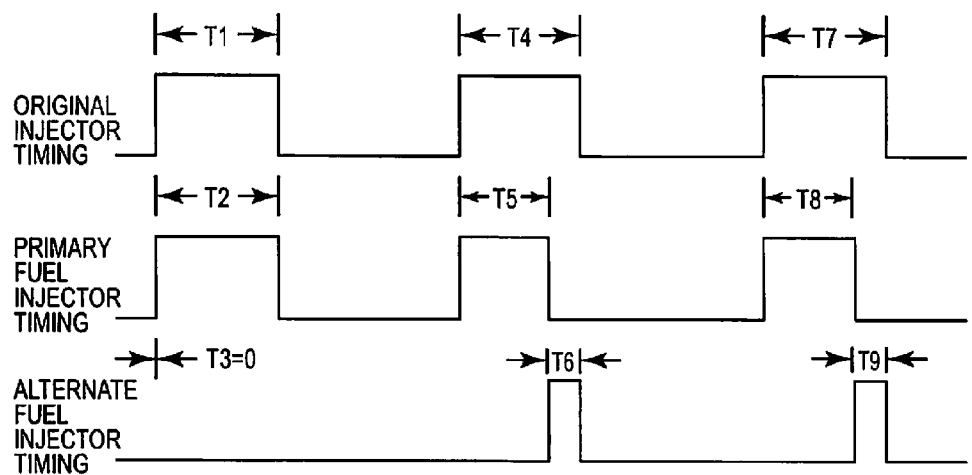
Figure 12:
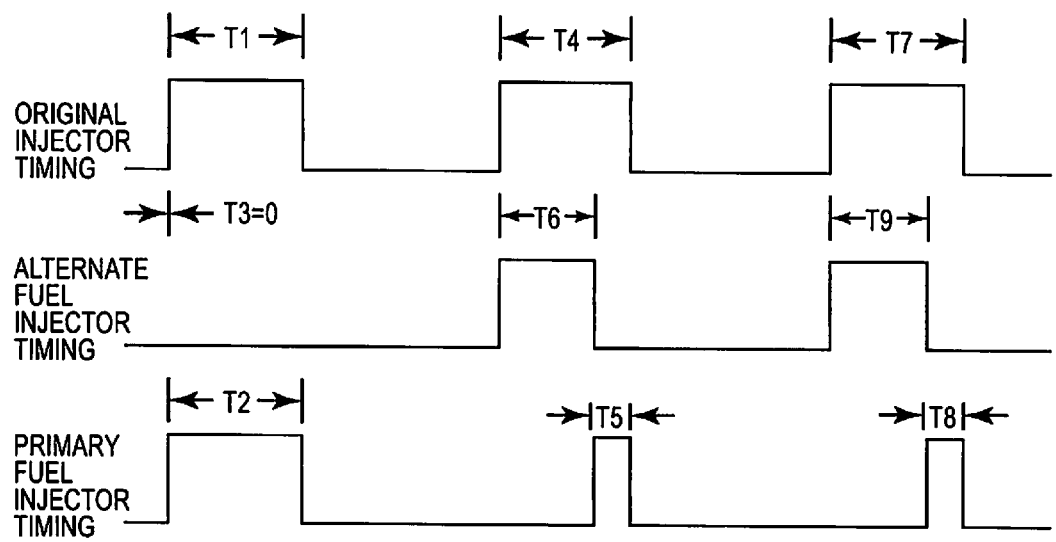
Figure 13:
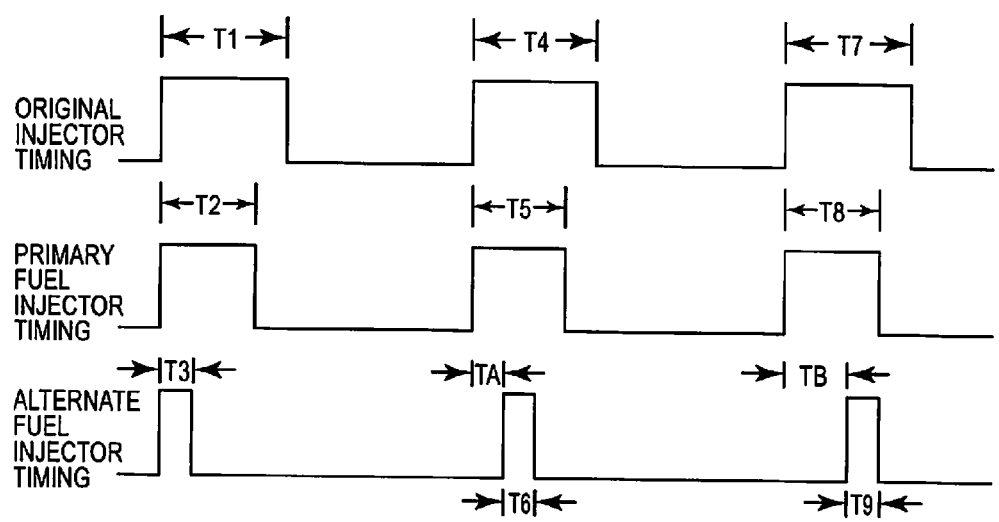
Figure 14:
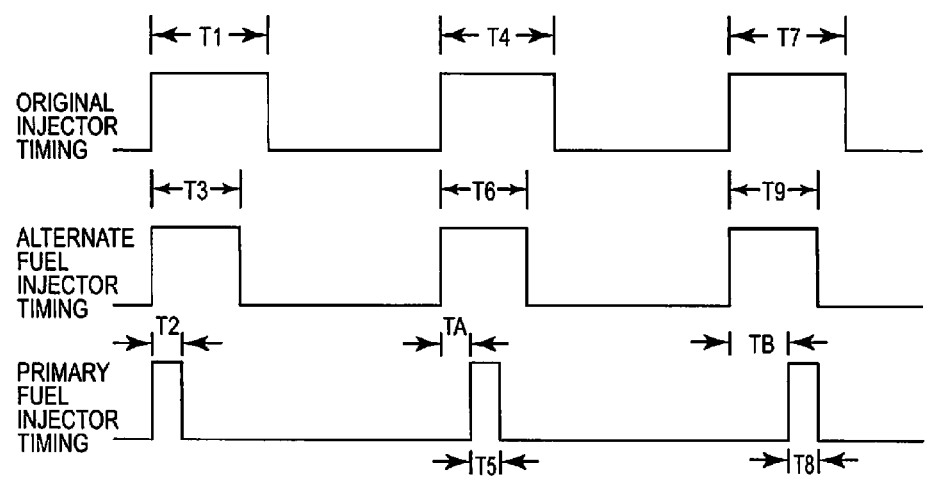
Figure 15:
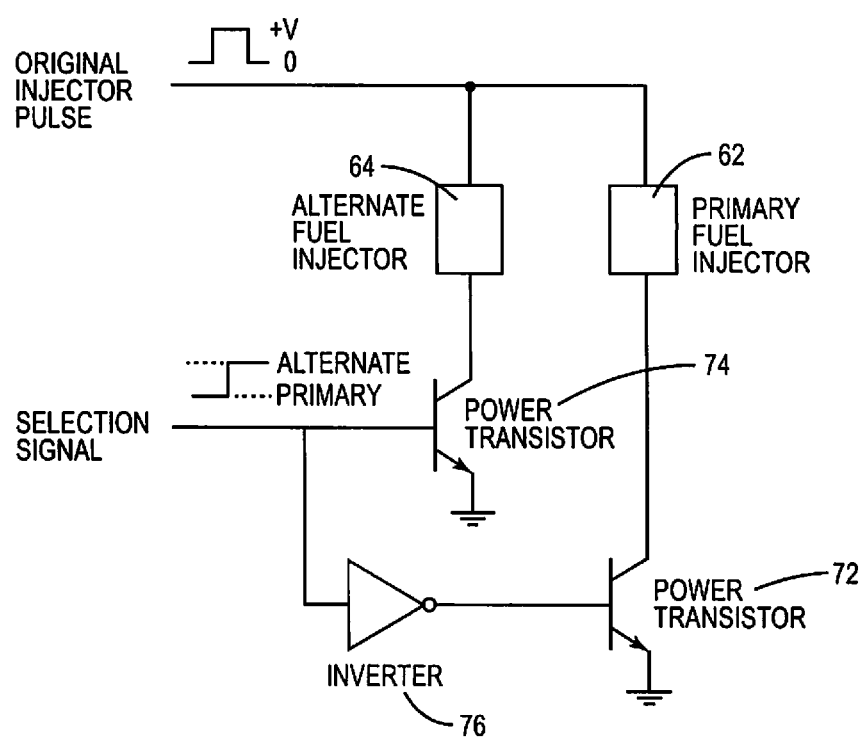
Figure 16:
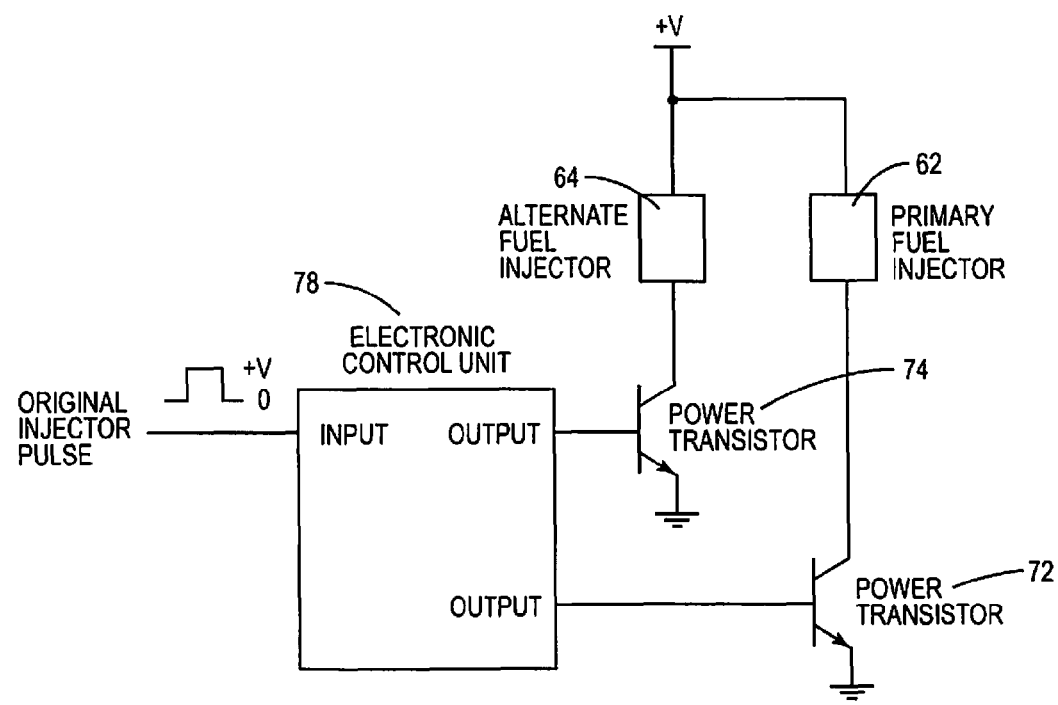

FIG. 7 a schematic illustration of a fuel control system in accordance with another embodiment of the present invention having a diesel fuel flow measurement device and a fuel supply measurement device;

FIG. 8 is a schematic illustration showing a fuel control system employing fuel injectors in accordance with another embodiment of the present invention;

FIG. 9 is a schematic illustration showing a fuel control system employing a fuel injector having a primary input port and an alternate input port in accordance with another embodiment of the present invention;

FIG. 10 is a schematic illustration showing a fuel control system employing a fuel injector having a primary input port and an alternate input port in accordance with another embodiment of the present invention;

FIG. 11 is a schematic illustration showing an original fuel injector timing pattern divided to create a primary fuel injector timing pattern and an alternate fuel injector timing pattern in accordance with one embodiment of the present invention;

FIG. 12 is a schematic illustration showing an original fuel injector timing pattern divided to create a primary fuel injector timing pattern and an alternate fuel injector timing pattern in accordance with another embodiment of the present invention;

FIG. 13 is a schematic illustration showing an original fuel injector timing pattern divided to create a primary fuel injector timing pattern and an alternate fuel injector timing pattern in accordance with another embodiment of the present invention;

FIG. 14 is a schematic illustration showing an original fuel injector timing pattern divided to create a primary fuel injector timing pattern and an alternate fuel injector timing pattern in accordance with another embodiment of the present invention;

FIG. 15 depicts a hardware implementation for dividing original fuel injector timing pulses into primary and alternate fuel injection output pulses in accordance with one embodiment of the present invention; and FIG. 16 depicts a hardware implementation for dividing original fuel injector pulses into primary and alternate fuel injection output pulses in accordance with another embodiment of the present invention.

DETAILED DESCRIPTION OF THE INVENTION

The present inventions now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

The present invention provides a fuel control system that can generally be used as an inexpensive and easily adaptable solution for selectively delivering a primary fuel and an alternate fuel for operation of an engine. For the purposes of this application, the term "selectively deliver," and other forms thereof, is defined as providing an engine with 100% primary fuel and 0% alternate fuel, 100% alternate fuel and 0% primary fuel, or any mixture of primary fuel and alternate fuel. As will be discussed in more detail below, the selection or mixing of fuels may be accomplished in a variety of ways and may be automated and continuously adaptable based on a variety of data, including data representative of the vehicle, the engine, and the environment.

Figure 1:
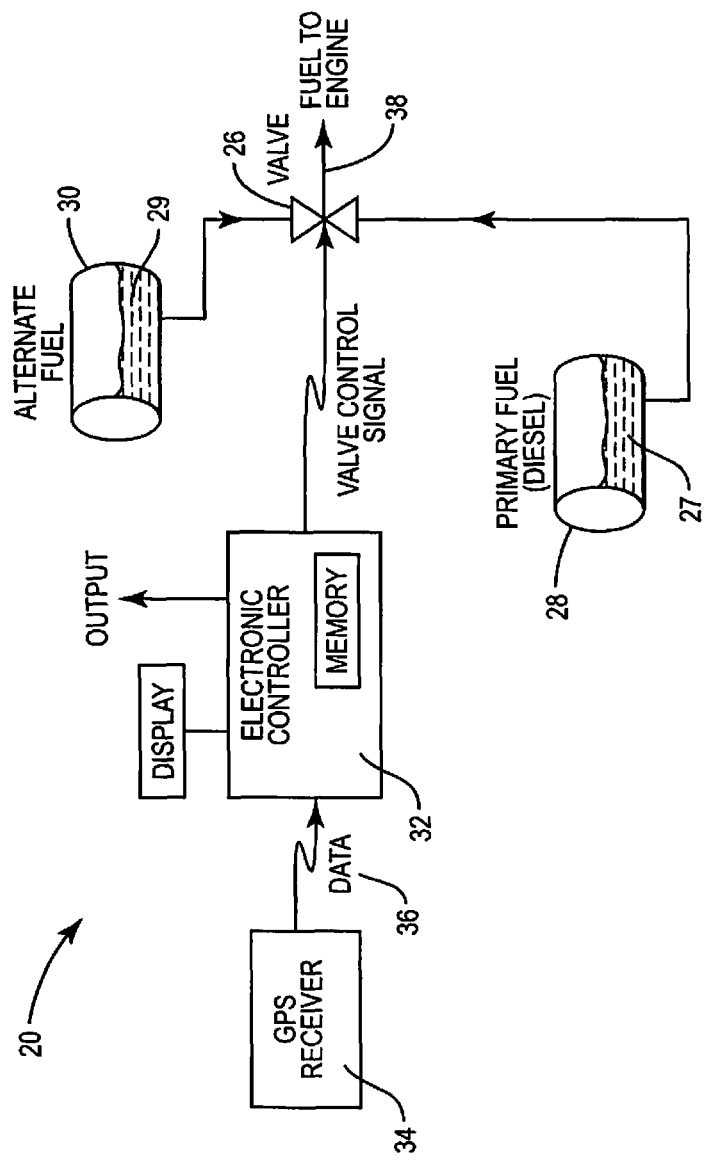
FIG. 1 is a schematic illustration of a fuel control system in accordance with one embodiment of the present invention.

Referring now to the drawings and, in particular, to FIG. 1, there is shown a fuel control system 20 for use in providing fuel to an internal combustion engine of a vehicle in accordance with one embodiment of the present invention. The fuel used by the engine may be a primary fuel 27 contained in a first fuel source 28, an alternate fuel 29 contained in a second fuel source 30, or, as will be described in more detail below, any combination of the primary fuel 27 and the alternate fuel 29. The fuel control system 20 depicted in FIG. 1 also includes a valve device 26, an electronic controller 32, and a global positioning system (GPS) receiver 34. For the purposes of this application, the term "valve device" is defined as any device capable of controlling in any way the flow of a fuel or fuels. It should be noted that in various embodiments, a valve device may or may not include a valve.

As shown in FIG. 1, the valve device 26 is configured to receive fuel from both the first fuel source 28 and the second fuel source 30, and generates a fuel supply 38 that is provided to the engine of the vehicle. The valve device 26, and hence the selection of the fuels, is controlled by a controller such as the electronic controller 32 or another controlling device, such as a microprocessor. In particular, the electronic controller 32 is structured to control the valve device 26 to selectively deliver the primary fuel 27 from the first fuel source 28 and the alternate fuel 29 from the second fuel source 30 according to the data 36 that is communicated to the electronic controller 32 from the GPS receiver 34.

As is commonly known in the art, the electronic controller 20 may comprise any device or combination of devices capable of controlling the valve device 26 such as through an algorithm, including, but not limited to, discrete logic circuits, synchronous or asynchronous machines, programmable gate arrays, and digital circuits and/or analog circuits. Likewise, control of the valve device 26 may be accomplished in many ways as are commonly known in the art including, but not limited to, electrical current established directly by driving a solenoid that controls the valve device 26, or indirect electrical control of a vacuum valve that controls the valve device 26. It should be noted that in various embodiments, the electronic controller 20 includes data storage memory that may be used for the basic computational functions. The data storage memory may also be used to store other data such as vehicle type and configuration data, user preferences, modes and settings, and to gather statistical data relating the operation of the vehicle and/or engine for display or for archival for later analysis and presentation. The electronic controller 20 may also be capable of communicating to external devices such as laptop computers and PDAs (Personal Data Assistants).

In the depicted embodiment, the alternate fuel 29 and the primary fuel 27 are provided to the valve device 26 under pressure. This can be accomplished in a number of ways as is commonly known in the art, including, but not limited to, a suction pump or other flow inducing mechanism, or by pressurizing the fuel sources. As a result, in various embodiments, flow may be established whenever there is no restriction in the path to the engine. In the depicted embodiment, the valve device is arranged such that loss or failure of control from the electronic controller 20 will result in use of the primary fuel 27.

GPS refers to a worldwide satellite navigational system of satellites that orbit the earth. Currently, there are about two dozen satellites in this system. The GPS satellites transmit uninterrupted radio signals containing precise information regarding each satellite's location, as well as information that indicates the length of time the signal took to reach the GPS receiver. A GPS receiver can receive signals from any number of satellites. By triangulating information received from three GPS satellites, a GPS receiver is typically capable of determining a longitude value and a latitude value that correspond the location of the GPS receiver. By using four satellites, a GPS system can typically also determine an altitude value that corresponds to the location of the GPS receiver.

Thus, by equipping a vehicle with a GPS receiver, such as the GPS receiver 34 shown in FIG. 1, a variety of GPS data 36 may be provided to the electronic controller 32. The GPS receiver 34 can transmit the GPS data 36 to the electronic controller 37 via physical connections, such as soldered connections, plug-type connections, etc., and other connections such as wireless connections, optical connections, etc. "GPS data" 36 refers to any data that may be gathered, determined, or calculated using the GPS receiver, and may include vehicle location, vehicle speed, vehicle acceleration, vehicle altitude, ground surface grade, and other similar data. For example, vehicle speed may relate to the rate of change of vehicle location, vehicle acceleration may relate to the rate of change of vehicle speed, and ground surface grade may relate to the rate of change of the vehicle altitude. In the embodiment shown in FIG. 1, the electronic controller 32 receives the GPS data 36 from the GPS receiver 34 and processes the GPS data 36 in order to control the valve device 26 to selectively deliver the primary fuel 27 and the alternate fuel 29 according to the GPS data 36.

The fuel system 20 is capable of automatically generating a fuel supply 38 with a composition ranging from 100% primary fuel 27 and 0% alternate fuel 29 to 100% alternate fuel 29 and 0% primary fuel 27. That is, the fuel supply 38 may be either of the two fuels 27, 29 or a mixture of the two fuels in any proportion. The ability to provide mixtures of the two fuels allows the fuel to be optimally matched with certain operating and/or environmental conditions. Such fuel supply compositions may be pre-determined based on optimal performance characteristics of the engine given the GPS data 36 processed by the electronic controller 32. Additionally, the ability to provide mixtures further allows for gradual transitions in operating conditions, such as where the fuel supply 38 switches from 100% primary fuel 27 to 100% alternate fuel 29 and vice versa.

It has been determined that at low temperatures, the viscosity of some alternate fuels may not be optimal for use in an engine designed to run on primary fuel. For example, an alternative fuel may not flow properly through a diesel engine if the fuel is below a certain temperature and therefore too viscous. However, at higher temperatures, the viscosity of the alternate fuel may be such that it will easily pass through the fuel delivery system. Thus, in one embodiment, the temperature of the alternate fuel can be related to GPS data 36, and the fuel control system 20 of the present invention can be used to control switching between 100% primary fuel 27 and 100% alternate fuel 29 based on a data threshold value. For example, the electronic controller 32 can determine that the engine and/or the fuel is at a minimum temperature if the vehicle has moved a certain distance within a certain time interval, if the vehicle has achieved a certain speed, or according to other operational characteristics determined using the GPS data 36. In some cases, the performance of the engine can be affected by the composition of the fuel supply 38 during certain vehicle conditions, and the electronic controller 32 can selectively provide a fuel supply composition 38 that comprises any mixture of the two fuels 27, 29 based on the GPS data. Thus, for example, it may be predetermined that a particular fuel supply composition 38 having a specific ratio of primary fuel 27 to alternate fuel 29 may be advantageous at a certain vehicle speed (as determined by the GPS receiver), and therefore the electronic controller 32 may control the valve device 26 to provide the specific ratio of primary fuel 27 to alternate fuel 29 when the GPS receiver 34 transmits vehicle speed data corresponding to that speed. Alternatively, it may be predetermined that a particular fuel supply composition 38 having a specific ratio of primary fuel 27 to alternate fuel 29 may be advantageous at certain vehicle altitudes (as determined by the GPS receiver 34), and therefore the electronic controller 32 of the present invention may control the valve device 26 to provide the specific ratio of primary fuel 27 to alternate fuel 29 when the GPS receiver 34 transmits vehicle altitude data corresponding to that altitude. It should be noted that in various embodiments, the electronic controller 32 of the present invention may also be capable of controlling the valve device 26 based on combinations of GPS data (such as, for example, a certain vehicle speed while the vehicle is positioned at a certain altitude, or according to vehicle speed and a rate of change of the vehicle's altitude).

Figure 2:
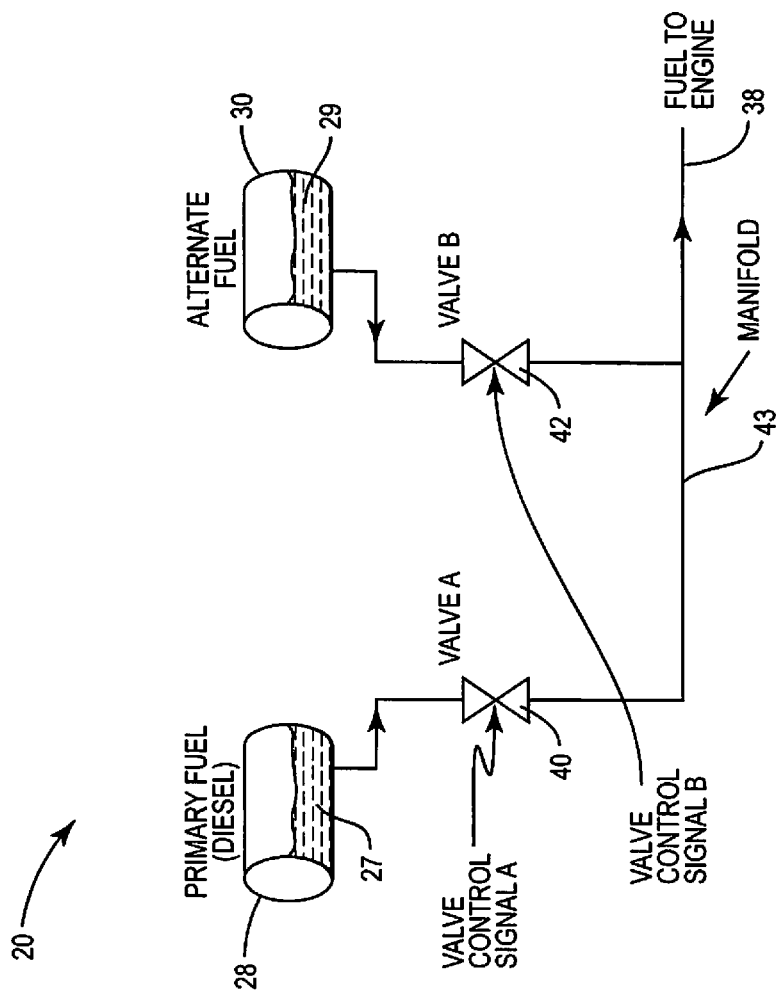
FIG. 2 is a schematic illustration of a two-valve embodiment of the fuel control system in accordance with another embodiment of the present invention.

It should be noted that in other embodiments of the present invention, the single valve device 26 may be replaced by multiple valve devices. For example, FIG. 2 shows a fuel control system 20 according to another embodiment of the present invention in which a primary valve device 40 receives primary fuel 27 contained in a first fuel source 28, and an alternate valve device 42 receives alternate fuel 29 contained in a second fuel source 30. The outputs of the primary valve device 40 and the alternate valve device 42 are combined in a manifold 43 to create the fuel supply 38. As with the embodiment depicted in FIG. 1, this configuration is also capable of automatically generating a fuel supply 38 that may comprise a range of compositions from 100% primary fuel 27 and 0% alternate fuel 29 to 100% alternate fuel 29 and 0% primary fuel 27, and any other mixture of primary fuel 27 and alternate fuel 29 therebetween, according to the GPS data.

Figure 3:
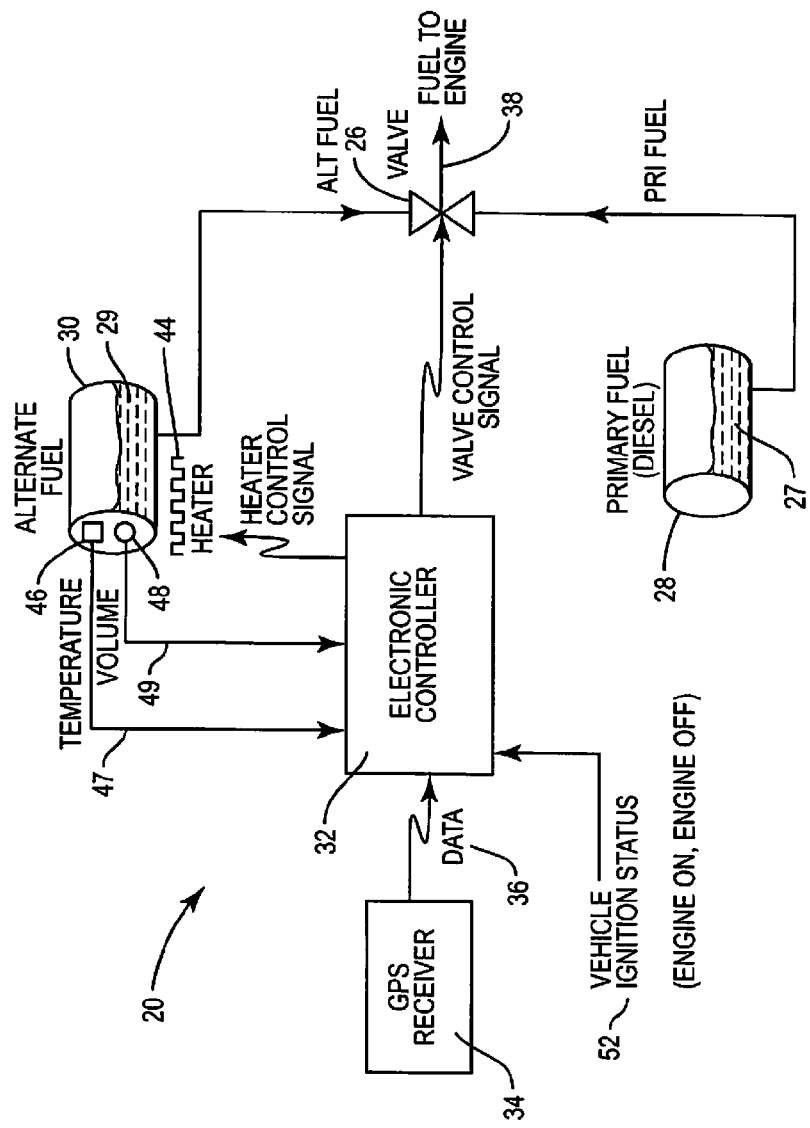
FIG. 3 is a schematic illustration of a fuel control system in accordance with another embodiment of the present invention having a heating mechanism, temperature sensing devices, and volume measurement devices.

FIG. 3 shows another embodiment of the present invention that is similar to the embodiment shown in FIG. 1 in that the fuel control system 20 includes a primary fuel 27 contained in a first fuel source 28, an alternate fuel 29 contained in a second fuel source 30, a valve device 26, an electronic controller 32, and a GPS receiver 34. The system 20 of FIG. 3 also includes a heating device 44 controllable by the electronic controller 32, a temperature sensing device 46, and an alternate fuel volume measurement device 48. The heating device 44 is structured to heat the alternate fuel 29 contained in the second fuel source 30, the temperature sensing device 46 is structured to measure the temperature of the alternate fuel 29, and the alternate fuel volume measurement device 48 is structured to measure the volume of the alternate fuel 29 contained in the second fuel source 30. The heating device 44 may be any type of heating device such as a resistive electrical heating element or an array of elements mounted adjacent or within the second fuel source 30, or a device for routing heated engine coolant or heated air through or proximate the second fuel source 30. The alternate fuel volume measurement device 48 can communicate an indication of the remaining volume of the second fuel to the electronic controller 32 so that, if the source 30 is empty, the electronic controller 32 provides fuel to the engine from the first fuel source 27. The temperature sensing device 46 may also be used to effect a control system (not shown) whereby heating is switched on and off, or otherwise modulated, such that an optimum alternate fuel temperature range is maintained. Additionally, temperature information may be displayed to the user using an indicator (not shown).

In addition to receiving GPS data 36 transmitted by the GPS receiver 34, the electronic controller 32 also receives temperature data 47 from the temperature measuring device 46 and volume data 49 from the alternate fuel volume measurement device 48. Additionally, the electronic controller receives various engine data 52 that may be provided by a multitude of independent sources, such as existing sensors and signal processing devices. For the purposes of the current specification and appended claims, the term "engine data" refers to any data that is characteristic of the engine, including, but not limited to engine temperature, engine RPM data, fuel injection timing data, engine exhaust temperature data, engine exhaust particulate data, engine throttle position data, transmission status data, emission control system data, ignition status data, and user preferences. Transmission status data may relate to such data as the particular gear that is selected at a given time. Ignition status data may relate to whether the ignition is in an 'On' or 'Off' position. Additionally, the ignition status data may warn of premature engine cutoff. The controller 32 can use the engine data in determining an optimal fuel mixture for maximizing efficiency, improving drivability, improving performance of the dual fuel system, and/or minimizing emissions. The controller 32 may also use the data for various other reasons, such as for example, to purge the fuel delivery components of the alternate fuel before stopping the engine.

As a result, the embodiment of the present invention illustrated in FIG. 3 provides a fuel control system 20 that is capable of automatically generating a fuel supply 38 that can have a range of compositions from 100% primary fuel 27 and 0% alternate fuel 29 to 100% alternate fuel 29 and 0% primary fuel 27, or a mixture of primary fuel 27 and alternate fuel 29 having any proportions of the two fuels, according to any GPS data, alternate fuel temperature data, alternate fuel volume data, engine data, and any combinations thereof. For example, the electronic controller may process alternate fuel temperature data 47 to control the valve device 38 to use alternate fuel 29 when the temperature of the alternate fuel 29 has reached a desirable level. Likewise, the electronic controller may process alternate fuel volume data 49 to adjust the ratio of primary fuel 27 to alternate fuel 29 based on the level of the alternate fuel 29 remaining in the second fuel source 30. Similarly, the electronic controller may process engine RPM data to adjust the ratio of primary fuel 27 to alternate fuel 29 based on the load exerted on the engine.

Figure 4:
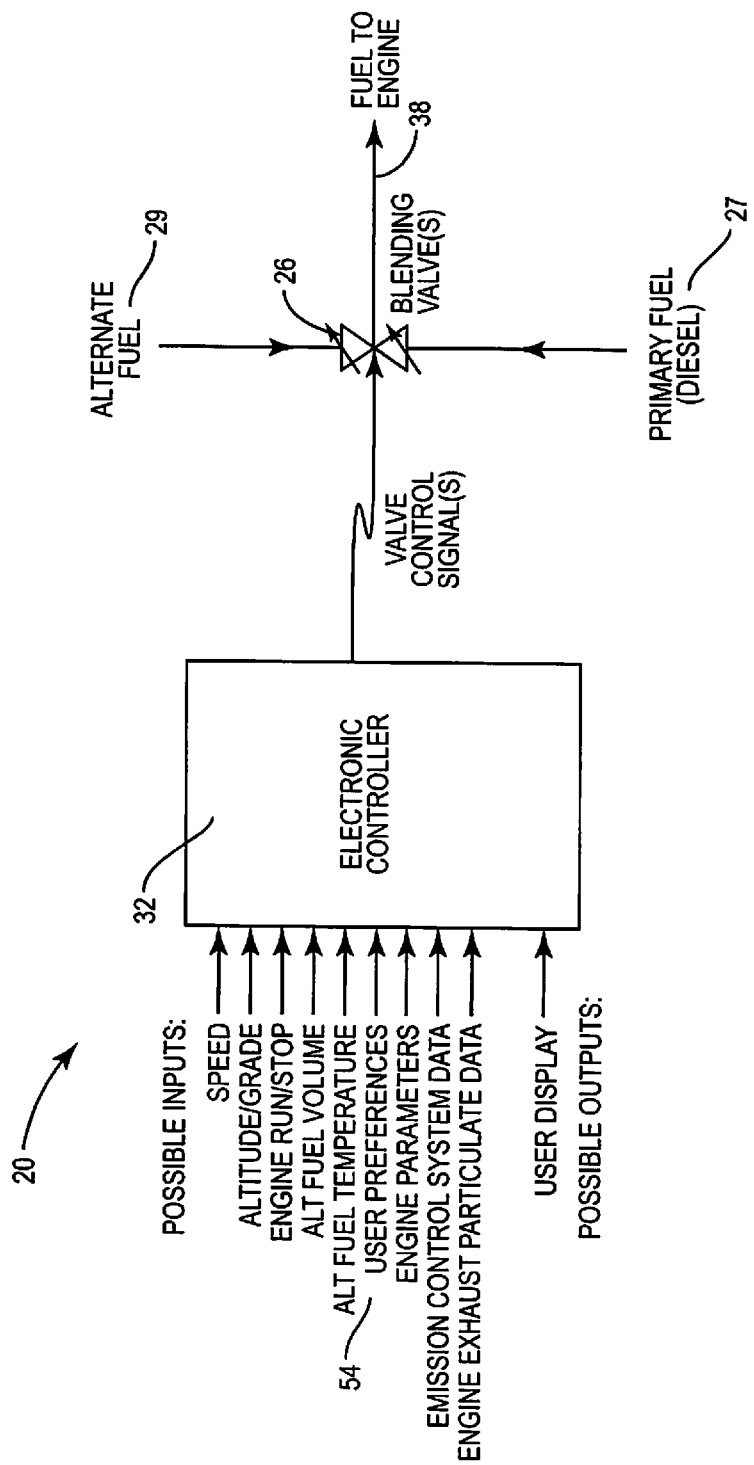
FIG. 4 is a schematic illustration of a fuel control system in accordance with another embodiment of the present invention.

FIG. 4 shows another embodiment of the present invention. The figure depicts a fuel control system 20 that includes an electronic controller 32 and a valve device 26. The valve device 26 receives a diesel fuel 27 and a vegetable oil fuel 29 and is configured to generate a fuel supply 38 to be delivered to an engine. As shown in the figure, the electronic controller is configured to receive a variety of operational data 54. The operational data may be supplied by a variety of sources, including an interface to the vehicle's electronic control module, various sensors, such as temperature sensors, wheel-pickup speed sensors, speedometer cable speed sensors, various timers, and/or other direct sensing devices. For the purposes of the current specification and appended claims, the term "operational data" is defined as GPS data, engine data, and/or any other data representative of the engine, vehicle, and/or other environmental conditions. Operational data may include, but is not limited to, the speed of the vehicle, engine temperature, engine RPM data, fuel injection timing data, engine exhaust temperature data, engine exhaust particulate data, engine throttle position data, transmission status data, emission control system data, altitude data, ground grade data, diesel fuel volume data, vegetable oil fuel volume data, vegetable oil fuel temperature data, user preference data, and time. The electronic controller 32 of the depicted embodiment is configured to control the valve device 26 so as to automatically generate a fuel supply 38 having any composition of the two fuels, i.e., 100% diesel fuel 27, 100% vegetable oil fuel 29, or any mixture therebetween, according to the operational data.

Figure 5:
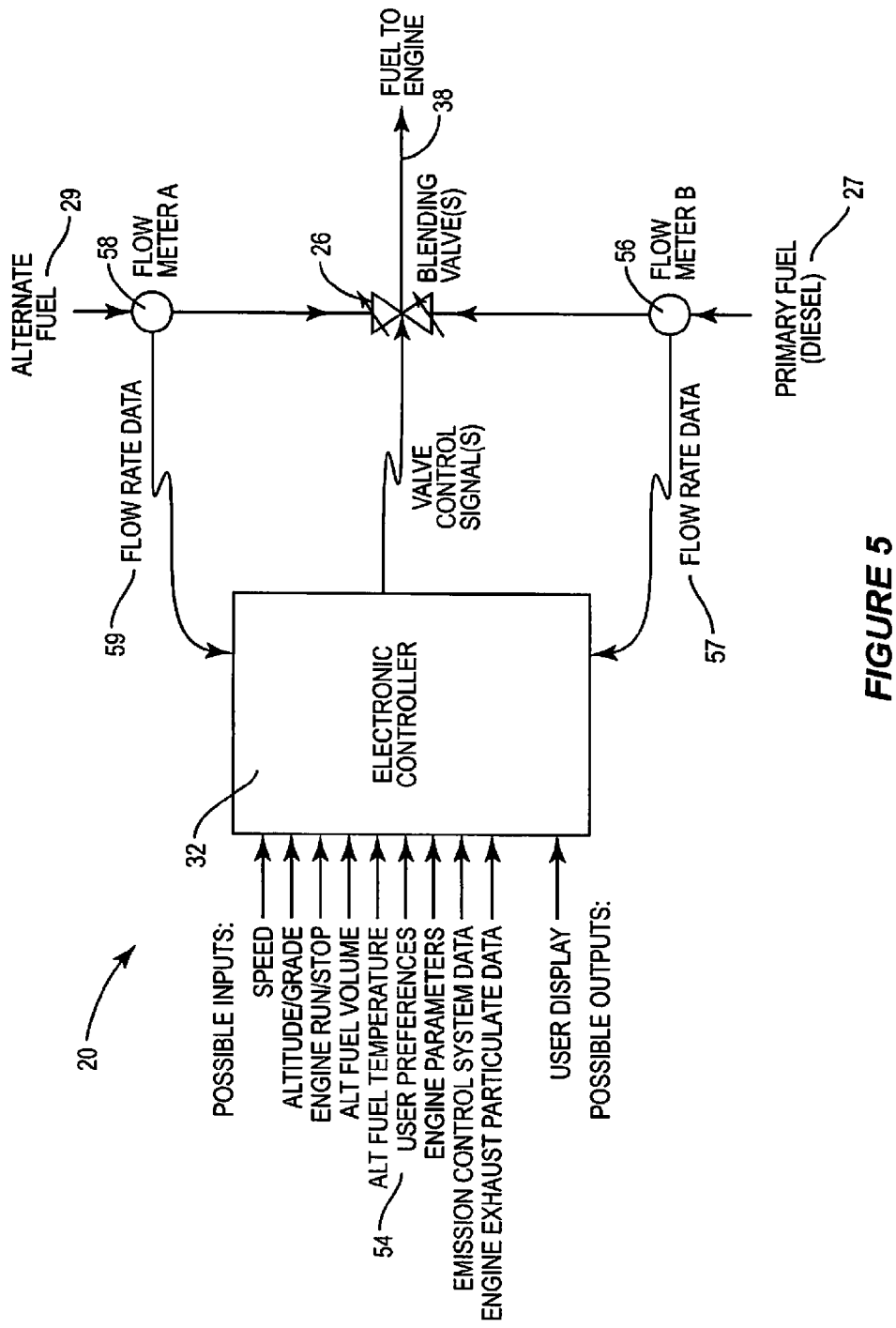
FIG. 5 is a schematic illustration of a fuel control system in accordance with another embodiment of the present invention having a diesel fuel flow measurement device and a vegetable oil fuel flow measurement device.
Figure 6:
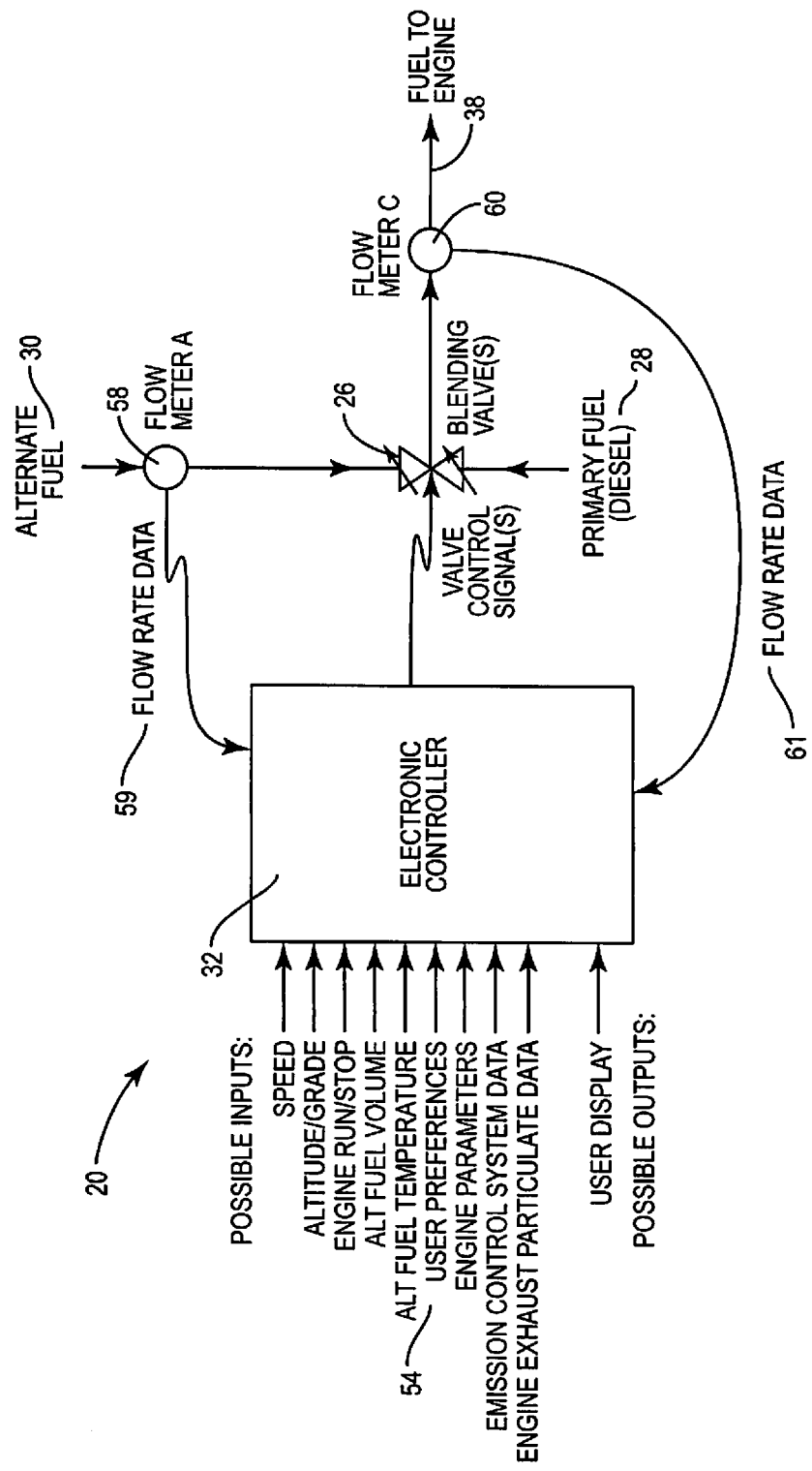
FIG. 6 is a schematic illustration of a fuel control system in accordance with another embodiment of the present invention having a vegetable oil fuel flow measurement device and a fuel supply measurement device.

FIGS. 5, 6, and 7 show three additional embodiments of the present invention. The embodiment depicted in FIG. 5 is similar the embodiment depicted in FIG. 4, but also includes a primary fuel flow meter 56 and an alternate fuel flow meter 58. The primary and alternate fuel flow meters 56, 58 are structured to provide the electronic controller 32 with primary fuel flow data 57 that is representative of the flow of the primary fuel 27, and alternate fuel flow data 59 that is representative of flow of the alternate fuel 29, respectively. In the depicted embodiment, the electronic controller 32 is configured to process the flow data 57, 59 to allow more precise control of the valve device 26 by providing feedback of the instantaneous flow rates contributed by each fuel such that the valve device 26 can be optimized during operation.

The control system illustrated in FIG. 6 is similar to the system of FIG. 5, except that a fuel supply flow meter 60 is used in the place of the alternate fuel flow meter. The fuel supply flow meter 60 is structured to provide the electronic controller 32 with fuel supply data 61 that is representative of the flow of the fuel supply 38 to the engine. Thus, by using the alternate fuel flow data 59 and the fuel supply data 61, the electronic controller may derive the primary fuel flow data algebraically. Therefore the electronic controller 32 can process the flow data 59, 61 to allow more precise control of the valve device 26 by providing feedback of the instantaneous flow rates contributed by each fuel so that the valve device 26 may be optimized during operation.

The control system illustrated in FIG. 7 is similar to the system of FIG. 6 except that a fuel supply flow meter 60 replaces the alternate fuel flow meter, and the alternate fuel flow is derived algebraically from the fuel supply data 61 and the primary fuel flow data 57. Thus the electronic controller 32 can process the flow data 57, 60 to allow more precise control of the valve device 26 by providing feedback of the instantaneous flow rates contributed by each fuel so that valve device 26 can be optimized during operation.

With regard to embodiments of the present invention that include fuel flow measurement devices, the electronic controller may use the fuel flow data in various ways. For example, the alternate fuel flow data may be used as an indication of the amount of alternate fuel use. Historical fuel use data may also be captured and may be used to monitor the amount of alternate fuel being used during a period of time or for the life of the vehicle. This information may also be stored in a data storage memory and may be output to a display or a reader. Thus, a user can detect or monitor the nature of the operation of the system and the engine, e.g., to determine the amount of alternate fuel that is used or the conditions under which the alternate fuel is being used.

FIG. 8 shows another embodiment of the present invention in which the valve device is a fuel injector used to deliver fuel directly into an engine combustion chamber 66 having a piston 68. In the depicted embodiment, the fuel injector is a mechanism that delivers a stream of a metered quantity of fuel. As shown, the fuel control system 20 includes a first fuel injector 62 that receives primary fuel 28, and a second fuel injector 64 that receives an alternate fuel 30. The first and second fuel injectors 62, 64 deliver fuel directly to a combustion chamber 66 of an engine. The first and second fuel injectors 62, 64 are controlled by an electronic controller (not shown) similar to that described above. The first and second fuel injectors 62, 64 may be controlled in many ways as are commonly known in the art including, but not limited to, electrical current established directly by driving a solenoid (not shown) that controls the injector operation. The electronic controller is structured to receive a variety of operational data, such as for example, vehicle speed data, engine RPM data, fuel injection timing data, engine exhaust temperature data, engine exhaust particulate data, engine throttle position data, transmission status data, emission control system data, altitude data, ground grade data, primary fuel volume data, alternate fuel volume data, alternate fuel temperature data, and user preference data, etc. As a result, the fuel control system 20 of the depicted embodiment is capable of generating any mixture of the two fuels in the combustion chamber 66, i.e., 100% primary fuel 27, 100% alternate fuel 29, or any mixture of primary fuel 27 and alternate fuel 29 therebetween, as a function of the operational data received by the electronic controller 32.

FIG. 9 shows another control system that is similar to the system of FIG. 8. In particular, the system 20 includes a first fuel injector 62 that delivers fuel directly into a combustion chamber 66 having a piston 68. The first fuel injector includes two input ports, i.e., a primary fuel input port 63 and an alternate fuel input port 65. The input ports 63, 65 of the first fuel injector 62 are independently controllable by an electronic controller (not shown) as similarly described above. The electronic controller is structured to receive operational data from various inputs. So configured, the fuel control system is capable of generating any mixture of the primary fuel 27 and alternate fuel 29 in the combustion chamber 66, i.e., 100% primary fuel 27, 100% alternate fuel 29, or any other mixture of the two fuels therebetween, as a function of the operational data received by the electronic controller 32. This embodiment may be advantageous for use with engine types that are inefficient or intolerant when 100% alternate fuel 29 is supplied to the combustion chamber 66, as a predetermined amount of primary fuel can be delivered to any or all of the combustion chambers 66 of the engine.

FIG. 10 shows another embodiment of the present invention similar to that described with respect to FIG. 9. In the depicted embodiment, a fuel control system is shown that includes a fuel injector 62 that delivers fuel directly into a combustion chamber 66 having a piston 68. The fuel injector 62 includes two discrete and separate flow paths. One flow path originates at a primary fuel input port 63 that receives primary fuel 27 and the other flow path originates at an alternate fuel input port 65 that receives an alternate fuel 28. As similarly described above, an electronic controller is structured to receive operational data from various inputs. So configured, the fuel control system is capable of generating any mixture of a primary fuel 27 and an alternate fuel 29 in the combustion chamber 66, i.e., 100% primary fuel 27, 100% alternate fuel 29, or any other mixture of the two fuels therebetween, as a function of the operational data received by the electronic controller.

As noted above, mixing of a primary fuel and an alternate fuel may be accomplished in a variety of ways. FIGS. 11-14 depict several exemplary embodiments directed to controlling the mixing of a primary fuel and an alternate fuel according to an original fuel injector timing pattern. In one embodiment, an original fuel injector timing pattern may be an existing timing pattern designed to operate a single fuel injector. In the depicted embodiments, a portion of the original fuel injector timing pattern is shown as a series of original fuel injector timing pulses T1, T4, T7. As shown the figures, mixing of a primary fuel and an alternate fuel may be accomplished by dividing each original fuel injector timing pulse T1, T4, T7 into respective primary fuel injector output pulses T2, T5, T8 and alternate fuel injector output pulses T3, T6, T9. Thus, an existing single fuel injector timing pattern may be used to generate a timing pattern for use by two fuel injectors, a primary fuel injector and an alternate fuel injector, in order to effect mixing of a primary fuel and an alternate fuel in accordance with the present invention. In various embodiments, division of each original timing pulse may be variable and may comprise 0% to 100% of the original fuel injector timing pulses. Thus, as shown in FIGS. 11 and 12, an original fuel injector pulse T1 may be divided into a primary fuel injector pulse T2 (which, for example, is 100% of the original fuel injector pulse T1) and an alternate fuel injector pulse T3 (which, for example, is 0% of the original fuel injector pulse T1). In the depicted embodiment, subsequent primary fuel injector timing pulses T5, T8 and alternate fuel injection timing pulses T6, T9, represent exemplary proportional divisions of original timing pulses T4, T7. In various embodiments, the primary fuel injector and the alternate fuel injector may be gated sequentially. For example, FIG. 11 shows the primary fuel injector being gated before the alternate fuel injector. However in other embodiments, the alternate fuel injector may be gated before the primary fuel injector, as shown by example in FIG. 12. In various other embodiments, the primary fuel injector and the alternate fuel injector may be gated non-sequentially. Additionally, various delays may be introduced. For example, FIGS. 13 and 14 show embodiments in which the original fuel injector timing pulses T1, T4, T7 are divided into primary fuel injector timing pulses T2, T5, T8 and alternate fuel injector timing pulses T3, T6, T9 that are gated non-sequentially and include delays TA, TB delaying the gating of certain primary and alternate fuel injector timing pulses.

FIGS. 15 and 16 depict exemplary hardware implementations for dividing original fuel injector pulses into primary and alternate fuel injection pulses. For example, FIG. 15 shows primary and alternate fuel injectors 62, 64 that are chosen via a selection signal based upon an original fuel injector pulse using two power transistors 72, 74 and an inverter 78. FIG. 16 includes an electronic control unit 78 that receives the original injector pulse as an input and produces the alternate and primary fuel injector control signals. In such a configuration, the electronic control unit possesses complete freedom to sequence the injectors by an algorithm.

As described above, the present invention provides a fuel control system that facilitates use of a primary fuel and an alternate fuel in an internal combustion engine. In one embodiment the fuel control system includes at least one valve device structured to deliver a fuel supply to the engine, a first fuel source structured to provide a primary fuel to the valve device, a second fuel source structured to provide an alternate fuel to the valve device, and an electronic controller structured to control the valve device. The electronic controller is structured to control the valve device as a function of various data to selectively deliver the primary fuel and the alternate fuel to generate a fuel supply. In other embodiments, the fuel system may provide some mixture of the primary fuel and the alternate fuel as a function of the data. In various embodiments, the data used to control the fuel supply can include GPS data, engine data, environmental data, and/or other operational data.

Many modifications and other embodiments of the invention set forth herein will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A fuel control system, comprising:
at least one valve device configured to direct fuel to an engine of a vehicle;
a first fuel source configured to provide a primary fuel to the at least one valve device;
a second fuel source configured to provide an alternate fuel to the at least one valve device;
at least one fuel measurement device configured to measure at least one of a fuel flow rate or a fuel volume of at least one of the primary fuel or the alternate fuel provided to the at least one valve device; and
an electronic controller configured to control the at least one valve device to selectively direct a mixture of the primary fuel and the alternate fuel through the valve device to the engine based on the measured fuel flow rate and/or the measured fuel volume of the primary fuel and/or the measured alternate fuel.

2. The fuel control system of claim 1, wherein the electronic controller is configured to control the at least one valve device based on user preferences.

3. The fuel control system of claim 1, wherein the electronic controller is configured to control the at least one valve device based on operational data concerning the vehicle.

4. The fuel control system of claim 3, wherein the electronic controller is further configured to:
control the at least one valve device to direct mainly the primary fuel to the engine when the operational data is below a data threshold value; and control the at least one valve device to direct mainly the alternate fuel to the engine when the operational data is above a data threshold value.

5. The fuel control system of claim 1, further comprising a global positioning system (GPS) receiver configured to transmit GPS data to the electronic controller;
wherein the electronic controller is further configured to control the at least one valve device according to the GPS data to selectively deliver the mixture to the engine.

6. The fuel control system of claim 1, wherein the at least one fuel measurement device is comprised of at least one fuel flow measurement device configured to measure the fuel flow rate of the primary fuel, the alternate fuel, or both the primary fuel and the alternate fuel;
wherein the electronic controller is configured to selectively direct the mixture of the primary fuel and the alternate fuel to the engine based on the measured primary fuel flow rate, the measured alternate fuel flow rate, or the measured primary fuel and the measured alternate fuel flow rates.

7. The fuel control system of claim 1, wherein the at least one fuel measurement device is comprised of at least one fuel volume measurement device configured to measure the primary fuel volume, the alternate fuel volume, or both the primary fuel volume and the alternate fuel volume;
wherein the electronic controller is configured to selectively direct the mixture of the primary fuel and the alternate fuel to the engine based on either the measured primary fuel volume, the measured alternate fuel volume, or both the measured primary fuel volume and the measured alternate fuel volume.

8. The fuel control system of claim 1, wherein the at least one fuel measurement device is comprised of:
a primary fuel measurement device configured to measure the primary fuel provided to the at least one valve device; and
an alternate fuel measurement device configured to measure the alternate fuel provided to the at least one valve device;
wherein the electronic controller is configured to control the at least one valve device to selectively direct the mixture of the primary fuel and the alternate fuel to the engine based on the measured primary fuel and/or the measured alternate fuel.

9. The fuel control system of claim 1, wherein the electronic controller is configured to provide an indication of the amount of use of the alternate fuel by the engine.

10. The fuel control system of claim 1, wherein the at least one valve device comprises at least one fuel injector structured to direct the fuel to a combustion chamber of the engine.

11. The fuel control system of claim 1, wherein the at least one valve device comprises a first fuel injector that receives the primary fuel from the first fuel source, and a second fuel injector that receives the alternate fuel from the second fuel source.

12. The fuel control system of claim 11, wherein the first fuel injector is controlled according to a first fuel injector output pulse and the second fuel injector is controlled according to a second fuel injector output pulse;
wherein an original fuel injector timing pulse is divided to create the first fuel injector output pulse and the second fuel injector output pulse.

13. The fuel control system of claim 11, wherein one of the first fuel injector and the second fuel injector is gated before the other.

14. The fuel control system of claim 1, further comprising a temperature sensing device structured to sense the temperature of the alternate fuel and/or primary fuel.

15. The fuel control system of claim 14, wherein the electronic controller is further configured to heat the alternate fuel in the second fuel source based on the temperature of the alternate fuel and/or primary fuel.

16. The fuel control system of claim 14, wherein the electronic controller is further configured to heat the primary fuel in the first fuel source based on the temperature of the primary fuel and/or alternate fuel.

17. The fuel control system of claim 1, wherein the electronic controller is further configured to control the at least one valve device to deliver the primary fuel to the engine when the second fuel source is empty.

18. The fuel control system of claim 1, wherein the electronic controller is further configured to control the at least one valve device to exclusively direct the primary fuel to the engine for a period of time to purge the engine prior to the engine being stopped.

19. The fuel control system of claim 1, wherein the electronic controller is further configured to control the at least one valve device to selectively direct the mixture of the primary fuel and the alternate fuel to the engine based on one or more of altitude, grade, and acceleration of the vehicle.

20. A fuel control system, comprising:
at least one valve device configured to direct fuel to an engine of vehicle;
a first fuel source configured to provide a primary fuel to the at least one valve device;
a second fuel source configured to provide an alternate fuel to the at least one valve device; and
a second fuel source measurement device configured to measure a volume of the alternate fuel in the second fuel source; and
an electronic controller configured to control the at least one valve device to selectively direct the primary fuel and the alternate fuel through the valve device to the engine based on the volume of the alternate fuel in the second fuel source.

21. The fuel control system of claim 20, wherein the electronic controller is further configured to control the at least one valve device to deliver the primary fuel to the engine when the alternate fuel source is empty.

22. The fuel control system of claim 20, wherein the electronic controller is further configured to control the at least one valve device to exclusively direct the primary fuel to the engine for a period of time to purge the engine prior to the engine being stopped.

23. The fuel control system of claim 20, wherein the electronic controller is configured to deliver a mixture of the primary fuel and the alternate fuel to the engine.

24. A fuel control system, comprising:
at least one valve device configured to direct fuel to an engine of a vehicle;
a first fuel source configured to provide a primary fuel to the at least one valve device;
a second fuel source configured to provide an alternate fuel to the at least one valve device;
at least one fuel measurement device configured to measure at least one of either the primary fuel or the alternate fuel provided to the at least one valve device; and
an electronic controller configured to control the at least one valve device, based on user preferences, to selectively direct a mixture of the primary fuel and the alternate fuel through the valve device to the engine based on the measured primary fuel and/or the measured alternate fuel.

25. A fuel control system, comprising:
at least one valve device configured to direct fuel to an engine of a vehicle;
a first fuel source configured to provide a primary fuel to the at least one valve device;
a second fuel source configured to provide an alternate fuel to the at least one valve device;
at least one fuel measurement device configured to measure at least one of either the primary fuel or the alternate fuel provided to the at least one valve device;
a global positioning system (GPS) receiver; and
an electronic controller configured to:
receive GPS data transmitted from the GPS receiver; and
control the at least one valve device, according to the GPS data, to selectively direct a mixture of the primary fuel and the alternate fuel through the valve device to the engine based on the measured primary fuel and/or the measured alternate fuel.

26. A fuel control system, comprising:
at least one valve device configured to direct fuel to an engine of a vehicle;
a first fuel source configured to provide a primary fuel to the at least one valve device;
a second fuel source configured to provide an alternate fuel to the at least one valve device;
a primary fuel measurement device configured to measure the primary fuel provided to the at least one valve device;
an alternate fuel measurement device configured to measure the alternate fuel provided to the at least one valve device; and
an electronic controller configured to control the at least one valve device to selectively direct a mixture of the primary fuel and the alternate fuel through the valve device to the engine based on the measured primary fuel and/or the measured alternate fuel.

27. A fuel control system, comprising:
at least one valve device configured to direct fuel to an engine of a vehicle;
a first fuel source configured to provide a primary fuel to the at least one valve device;
a second fuel source configured to provide an alternate fuel to the at least one valve device;
at least one fuel measurement device configured to measure at least one of either the primary fuel or the alternate fuel provided to the at least one valve device; and
an electronic controller configured to:
control the at least one valve device to selectively direct a mixture of the primary fuel and the alternate fuel through the valve device to the engine based on the measured primary fuel and/or the measured alternate fuel; and
provide an indication of an amount of use of the alternate fuel by the engine.

28. A fuel control system, comprising:
at least one valve device configured to direct fuel to an engine of vehicle;
a first fuel source configured to provide a primary fuel to the at least one valve device;
a second fuel source configured to provide an alternate fuel to the at least one valve device;
a second fuel source measurement device configured to measure a flow rate of the alternate fuel from the second fuel source; and
an electronic controller configured to control the at least one valve device to selectively direct the primary fuel and the alternate fuel through the valve device to the engine based on the flow rate of the alternate fuel from the second fuel source.

29. The fuel control system of claim 28, wherein the electronic controller is further configured to control the at least one valve device to deliver the primary fuel to the engine when the second fuel source is empty.

30. The fuel control system of claim 28, wherein the electronic controller is further configured to control the at least one valve device to exclusively direct the primary fuel to the engine for a period of time to purge the engine prior to the engine being stopped.

31. The fuel control system of claim 28, wherein the electronic controller is configured to deliver a mixture of the primary fuel and the alternate fuel to the engine.

* * * * *